US007194950B1

United States Patent
Quantz et al.

(10) Patent No.: US 7,194,950 B1
(45) Date of Patent: *Mar. 27, 2007

(54) APPARATUS FOR SUCCESSIVELY DELIVERING NUTS TO A HIGH PRODUCTION NUTCRACKER

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/257,630

(22) Filed: Oct. 25, 2005

(51) Int. Cl.
   *A23N 5/00* (2006.01)
(52) U.S. Cl. .............................. 99/571; 99/574; 99/581
(58) Field of Classification Search .......... 99/571–576, 99/577–579, 568, 580–583; 426/281, 282; 30/120.1; 198/622
   See application file for complete search history.

(56) References Cited

U.S. PATENT DOCUMENTS

| 3,871,275 | A | * | 3/1975 | Quantz ........................ 99/571 |
| 4,332,827 | A | | 6/1982 | Quantz |
| 5,247,879 | A | * | 9/1993 | Frederiksen et al. .......... 99/575 |
| 5,623,867 | A | | 4/1997 | Quantz |
| 6,182,562 | B1 | | 2/2001 | Quantz et al. |
| 6,205,915 | B1 | | 3/2001 | Quantz |
| 6,270,824 | B1 | | 8/2001 | Quantz |
| 6,584,890 | B1 | | 7/2003 | Quantz et al. |
| 6,588,328 | B1 | | 7/2003 | Quantz et al. |
| 6,772,680 | B1 | | 8/2004 | Quantz et al. |

* cited by examiner

Primary Examiner—Timothy F. Simone
(74) Attorney, Agent, or Firm—Alston & Bird LLP

(57) ABSTRACT

A high production nutcracking apparatus wherein the nuts are fed from a hopper on a feed conveyor which has an upwardly inclined segment which passes through the hopper, a horizontal segment which leads to the cracking apparatus, and an arcuate transition juncture which is between the two segments. The nuts are received in nut transport elements of the feed conveyor, and they are singularized and oriented while being advanced by means of a deflecting plate which overlies the feed conveyor from a point along the upwardly inclined segment, along the transition juncture, and to a delivery point where the nuts are lifted from the conveyor by a cracking turret. The downstream end portion of the deflecting plate comprises an elastomeric flap, which is highly flexible and relatively soft and which engages the advancing nuts with a frictional force sufficient to roll the nuts about their end to end axes and thereby properly orient the nuts in the nut transport elements. The elevation of the feed conveyor relative to the cracking turret can be adjusted to accommodate nuts of different sizes.

17 Claims, 3 Drawing Sheets

APPARATUS FOR SUCCESSIVELY DELIVERING NUTS TO A HIGH PRODUCTION NUTCRACKER

BACKGROUND OF THE INVENTION

The present invention relates to a nut delivery apparatus for a high speed nutcracker and which achieves a high degree of efficiency in picking up and cracking the nuts.

U.S. Pat. Nos. 4,332,827; 5,623,867; 6,182,562; 6,205,915; 6,270,824; 6,584,890, 6,588,328; and 6,772,680 all disclose a high speed nutcracking apparatus which includes a rotatable turret which mounts a plurality of cracking units arranged about its periphery, with each cracking unit having an opening adapted to receive an individual nut from a feed conveyor which comprises a plurality of nut transport elements mounted in succession on a feed chain. Each of the nut transport elements includes an upwardly open transverse receptacle for holding an individual nut, and each cracking unit on the turret has an anvil which is moved axially into the receptacle at a pick up point so that the nut is engaged between the anvil and a crack die on the other side of the opening.

In operation, the feed conveyor moves tangentially past the rotating turret so that the anvils of the cracking units enter the receptacles of respective nut transport elements at the pick up point and engage and pick up the nut. After the cracking unit and engaged nut have moved away from the pick up point and reach a cracking location, the crack die of the cracking unit is impacted by a shuttle so that the crack die applies an impact to the nut to crack the shell.

As will be apparent, it is important that the nut delivery system be able to deliver a single nut in the receptacle of each nut transport element, and that the nut be oriented with its end to end direction aligned in the receptacle. To achieve this objective, the prior feeding systems include an arrangement to singulate and orient the nuts as they are received in the receptacles of the nut transport elements and as the elements move through the hopper. For example, and as disclosed in U.S. Pat. No. 6,205,915, the hopper includes an orienting deflecting plate which is designed for laterally deflecting the upper portion of any upstanding nuts disposed in each receptacle. To singulate the nuts in each receptacle, there is provided a singulating arm in the form of a wire which extends into a slot in one side of each of the advancing nut transport elements, and which serves to laterally eject any laterally oriented nuts in excess of one from each receptacle. The wire arm is mounted for pivotal adjustment about a mounting pin.

Pecans vary significantly in size, and they are typically run through a sizing machine prior to cracking so as to separate the nuts into different grades. To adjust the singularizing and orienting arrangement to efficiently process nuts of different sizes, the singulating wire arm as shown in FIG. 3 of the '915 patent is pivotally adjusted to vary the distance the arm extends into the slots of the advancing nut transport elements. Thus for smaller nut grades, the arm is pivoted to extend further into the slots, and for larger grades, the arm is pivoted to extend a lesser extent into the slots.

In copending application Ser. No. 11/201,827, filed Aug. 11, 2005, an improvement is disclosed wherein the singulating wire arm is replaced with a flat singulating arm which extends laterally into the slot of each advancing element. Also, an actuating member which is located on the outside of a side wall of the hopper is provided for adjusting the lateral extent to which the arm extends into the slots of the advancing elements. The adjustment of the machine to accommodate nuts of different grades is thereby greatly facilitated.

The orienting deflecting plate as disclosed in the '915 patent comprises a rigid metal bar which is mounted for pivotal movement about a horizontal axis at the upstream end of the bar, and the downstream end portion of the bar comprises a thin metal extension plate which is sufficiently thin to permit it to be easily bent to closely conform to the arcuate path of the feed chain as it moves from an upwardly inclined direction to a horizontal direction which extends tangentially past the lower portion of the turret. The arcuate extension plate serves to prevent the nuts from lifting from the nut transport elements as the nut transport elements move rapidly through the arcuate juncture.

The thin metal extension plate as described above is problematic in a number of respects. For example, if the machine operator should rotate the turret in a reverse direction in the course of a maintenance procedure, the feed chain will also move in the reverse direction since its drive is interconnected with that of the turret, and the forward end of the extension plate can be caught on the upper rear corner of a nut transport element of the feed chain, causing the extension plate to bow upwardly and be permanently bent. When this happens, it is often necessary to replace the entire extension plate.

A further problem associated with the prior extension plate is the fact that occasionally two or more nuts are received in the receptacle of a nut transport element, and such double feed of the nuts will reach the extension plate and be delivered to the pick up point where the nuts are dropped without being cracked. Also, when this happens, the extension plate will be lifted by the nuts, which causes the entire deflecting plate to lift upwardly. This in turn permits additional double feeds to enter under the deflecting plate, and the condition is repeated and becomes self-perpetuating.

The embodiment of the apparatus disclosed in U.S. Pat. No. 6,205,915 also includes an adjustable support plate which supports the nut transport elements as they advance in a horizontal direction toward and across the nut pick up point on the turret. The support plate is adjustable in elevation by pivoting it about a pivot axis, so that the elevation of the receptacles of the nut transport elements as they move past the pick up point can be adjusted to accommodate nuts of different sizes.

During operation of the apparatus as disclosed in the '915 patent, it has been found that the anvil of a cracking unit can fail to retract during operation. While this failure to retract is rare, it can cause damage to the support plate when it occurs. In particular, when the anvil fails to retract and remains in the nut receiving opening of the cracking unit, it will strike the nut in the nut transport element at the pick up location with sufficient force to permanently bend the underlying support plate. The support plate often then needs to be replaced.

It is accordingly an object of the present invention to provide an improved high speed nutcracking apparatus which avoids the problems associated with the prior machines as noted above.

It is a more particular object of the present invention to provide a high speed nutcracking apparatus of the described type and which includes an improved and more reliable system for orienting the nuts in the nut transport elements as they move toward the delivery point, and to thereby achieve an improved feed efficiency.

It is also an object of the present invention to provide an improved support plate for supporting the nut transport elements as they move past the delivery point, and which is not susceptible to bending from an impact resulting from an anvil which has failed to retract from the nut receiving opening of a cracking unit.

SUMMARY OF THE INVENTION

These and other objects and advantages of the present invention are achieved in the embodiment illustrated herein by the provision of a nut feeding apparatus which comprises a hopper for storing a relatively large quantity of the nuts to be cracked, and an endless conveyor which has an upper run extending through the hopper to a delivery point exteriorly thereof. The conveyor includes a feed chain and a plurality of nut transport elements mounted in succession on the feed chain. Each element includes opposite sides and a generally semi-circular, laterally extending receptacle which faces upwardly during movement of the element through the hopper and to the delivery point, and each receptacle is sized to supportingly receive a single nut to be cracked and which is oriented with its end to end direction extending along the receptacle.

The upper run of the endless conveyor includes an upwardly inclined segment extending through the lower portion of the hopper and a substantially horizontal segment extending from the upwardly inclined segment to the delivery point, and the upwardly inclined segment and the horizontal segment define an arcuate transition juncture therebetween.

A drive system is provided for rotating the endless conveyor such that the nut transport elements move in succession through the hopper and to the delivery point, and a deflecting plate is positioned so as to continuously overlie the path of the nut transport elements from a point along the upwardly inclined segment, along the transition juncture, and to a point immediately upstream of the delivery point. Also, the deflecting plate is mounted by means of a horizontal pivotal connection adjacent the upstream end of the plate such that the plate may be lifted upwardly from the elements.

The deflecting plate comprises an upstream end portion which comprises a relatively rigid bar, and a downstream end portion which comprises a highly flexible and relatively soft elongate flap which is composed of an elastomeric material and which is configured to rest upon the nuts being conveyed by the transport elements along the horizontal segment of the upper run of the conveyor and toward the delivery point.

The elastomeric flap of the present invention has been found to provide several significant and unexpected advantages as compared to the thin metal extension plate of the prior art. In particular, should the turret be rotated in the reverse direction to cause the feed chain to move in the rearward direction, the elastomeric flap will simply flex in the event it is engaged by the upper rear corner of a transport element, note FIG. 3B, and it can then return to its original configuration without damage.

Secondly, and perhaps more importantly, is the fact that the elastomeric flap serves to frictionally engage the advancing nuts, causing them to rotate about their end to end axes in the associated receptacles of the nut transport elements. This rotation in turn causes the nuts to be aligned in the end to end direction in the receptacles, so as to facilitate their successful pick up by the cracking units of the turret at the delivery point.

One further advantage provided by the elastomeric flap is the fact that upon more than one nut being received in a receptacle, the elastomeric flap will flex to form a small bump which moves with the advance of the double feed. The flap however does not lift upwardly, and the upstream rigid bar does not lift to cause additional double feeds as can occur with the prior deflecting plate as noted above.

As a further aspect of the present invention, the support plate which underlies and supports the advancing nut transport elements at the delivery point where the nuts are picked up by the cracking turret, comprises an elongate support bar composed of a polymeric material which has sufficient strength to support the nut transport elements but yet is sufficiently flexible to permit the portion thereof immediately below the delivery point to resiliently bow or flex downwardly. Thus in the event an anvil of a nutcracking unit fails to retract and impacts a nut in the receptacle of a nut transport element, the elongate support bar will simply bow or flex without permanent bending or breakage.

BRIEF DESCRIPTION OF THE DRAWINGS

Some of the objects and advantages of the invention having been stated, others will appear as the description proceeds, when taken in connection with the accompanying drawings, in which.

DETAILED DESCRIPTION OF THE PREFERRED EMBODIMENTS

Figure 1:
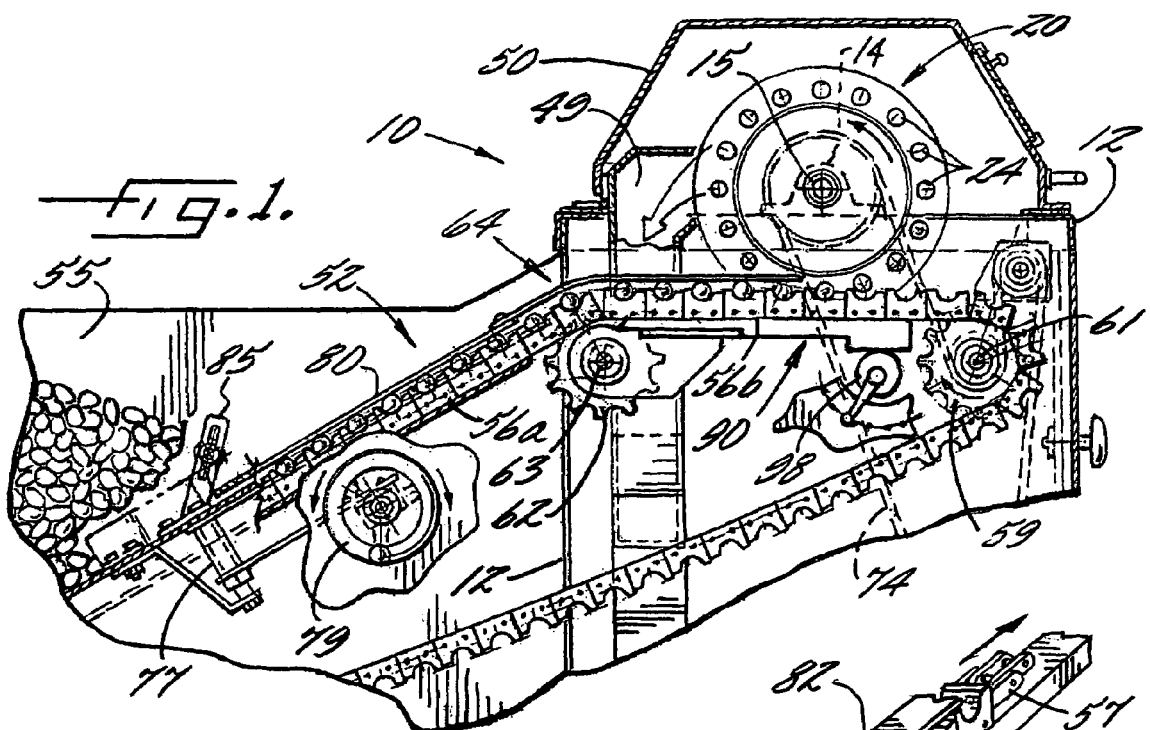
FIG. 1 is a fragmentary sectional side elevation view of a nutcracking apparatus which embodies the features of the present invention.

Referring more specifically to the drawings, a nutcracking apparatus embodying the features of the present invention is illustrated generally at 10 in FIG. 1. The apparatus includes a rectangular box-like frame 12 which supports a pair of bearing blocks 14 (only one being visible in dashed lines in FIG. 1) which rotatably mount a central shaft 15 which defines a horizontal central axis.

Figure 6:
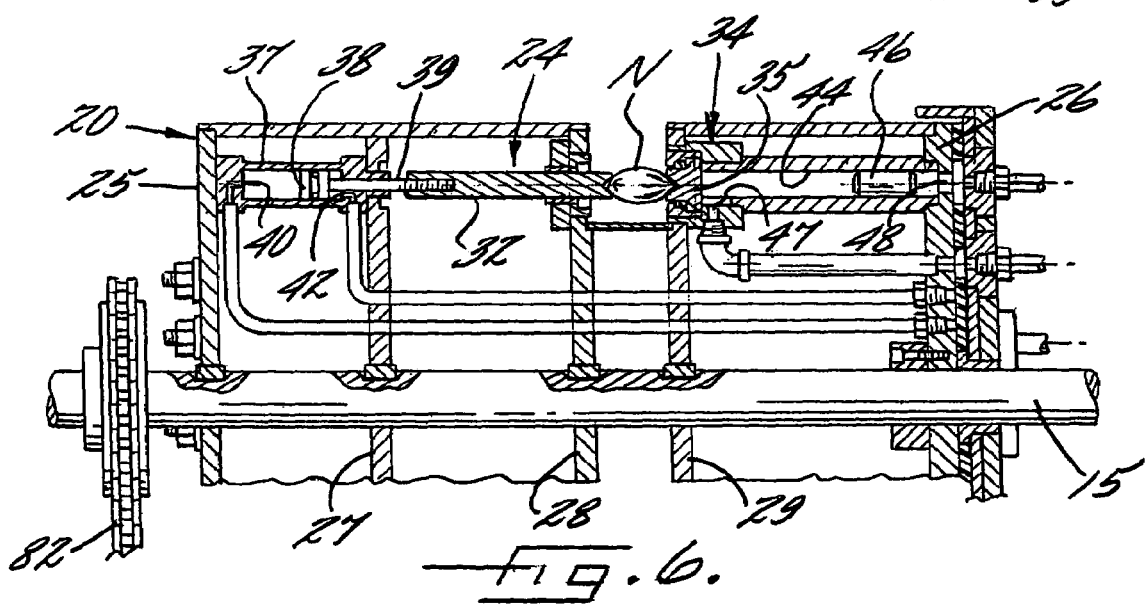
FIG. 6 is a fragmentary sectional view of the upper portion of the turret, and illustrating one of the cracking units.

As best seen in FIG. 6, a turret 20 is fixedly mounted to the shaft 15 so as to be rotatable with the shaft about the central axis. The turret 20 comprises a plurality of elongate cracking units 24 which are circularly arranged about the shaft and supported by the end plates 25 and 26, and the intermediate plates 27, 28 and 29. There are sixteen cracking units 24 in the illustrated embodiment and the units extend generally parallel to each other and to the central axis.

Each of the cracking units 24 comprises an anvil 32, a cracking die assembly 34 which includes a cracking die 35. The anvil and cracking die assembly are mounted in an axially aligned, opposed relationship to define an opening for receiving a nut N therebetween. More particularly, the means for mounting the anvil 32 includes a first air cylinder 37, a piston 38 slidably disposed within the cylinder 37, a piston rod 39 interconnecting the piston and anvil, a first air port 40 disposed adjacent the rearward end of the cylinder, and a second air port 42 disposed adjacent the forward end of the cylinder. As will be apparent, movement of the piston 38 results in a corresponding movement of the anvil 32, either forwardly toward the cracking die assembly 34 or rearwardly therefrom. Such movement is controlled by air which is selectively provided to the first and second ports 40, 42 in a manner more fully disclosed in U.S. Pat. Nos. 4,418,617; 4,441,414; and 6,182,562 the disclosures of which are expressly incorporated herein by reference.

The cracking die assembly 34 is more fully described in the above referenced '414 patent, and the '562 patent, and it includes the cracking die 35, and a second air cylinder 44. A free floating shuttle 46 is mounted within the cylinder 44. In addition, there is provided an air port 47 adjacent the forward end of the cylinder and a further port 48 which extends axially through the rearward end of the cylinder.

The control system for cyclically actuating the cracking unit includes an air control system whereby air is selectively introduced into the four ports 40, 42, 47, and 48. More particularly, upon receiving a nut N in the opening between the anvil 32 and cracking die assembly 34, air is first introduced into the port 40 so that the piston 38 and anvil 32 are moved forwardly and such that the anvil 32 operatively engages one end of the nut N in the opening. The nut thereby becomes supported between the anvil 32 and cracking die 35. The anvil 32 and cracking die 35 thereby also serve to compressively stress the retained nut. High pressure air is next injected through the port 48 and into the air cylinder 44, such that the shuttle 46 is thrust forwardly along the cylinder and impacts against the rear end surface of the cracking die 35, causing the cracking die to sharply advance a short distance forwardly against the nut and thereby crack its shell. The air in front of the advancing shuttle is permitted to exhaust through the port 47. Air next enters the port 42, causing the piston 38 and anvil 32 to move rearwardly and release the nut, which falls into a discharge chute 49.

As a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the apparatus 10 may be obtained from the above noted prior patents.

The turret 20 is covered by a protective hood 50, which is pivotally mounted to the frame 12 to provide access to the turret for maintenance and cleaning purposes.

The apparatus of the present invention further includes an apparatus 52 for advancing and delivering a plurality of nuts individually in succession along a path of travel to the rotating turret 20. This nut delivering apparatus includes a hopper 55 for storing a relatively large quantity of the nuts to be cracked, and an endless feed conveyor 56 which includes a feed chain 57 (FIG. 2) and a pair of supporting sprockets, with one of the sprockets being located in the bottom portion of the hopper (and which is not shown) and with the other sprocket being shown at 59 and which mounted on shaft 61. Also, there is provided an intermediate supporting sprocket 62 mounted on the shaft 63 as further described below.

The conveyor 56 is mounted for movement about the sprockets, and includes an upper run which extends through the lower portion of the hopper 55 and along an upwardly inclined path of travel to a delivery point which corresponds to the bottom dead center position of the turret 20 and which is also the point at which the nuts are picked up by the turret.

The upper run of the endless conveyor includes an upwardly inclined segment 56a extending through the lower portion of the hopper, and a substantially horizontal segment 56b extending from the upwardly inclined segment to the delivery point and which is tangentially aligned along the bottom dead center position of the cracking units 24. The upwardly inclined segment 56a and the horizontal segment 56b define a transition juncture 64 therebetween and which is also defined by the supporting sprocket 63. More particularly, the transition juncture 64 is arcuately curved in accordance with the circumferential curvature of the supporting sprocket 62.

Figure 2:
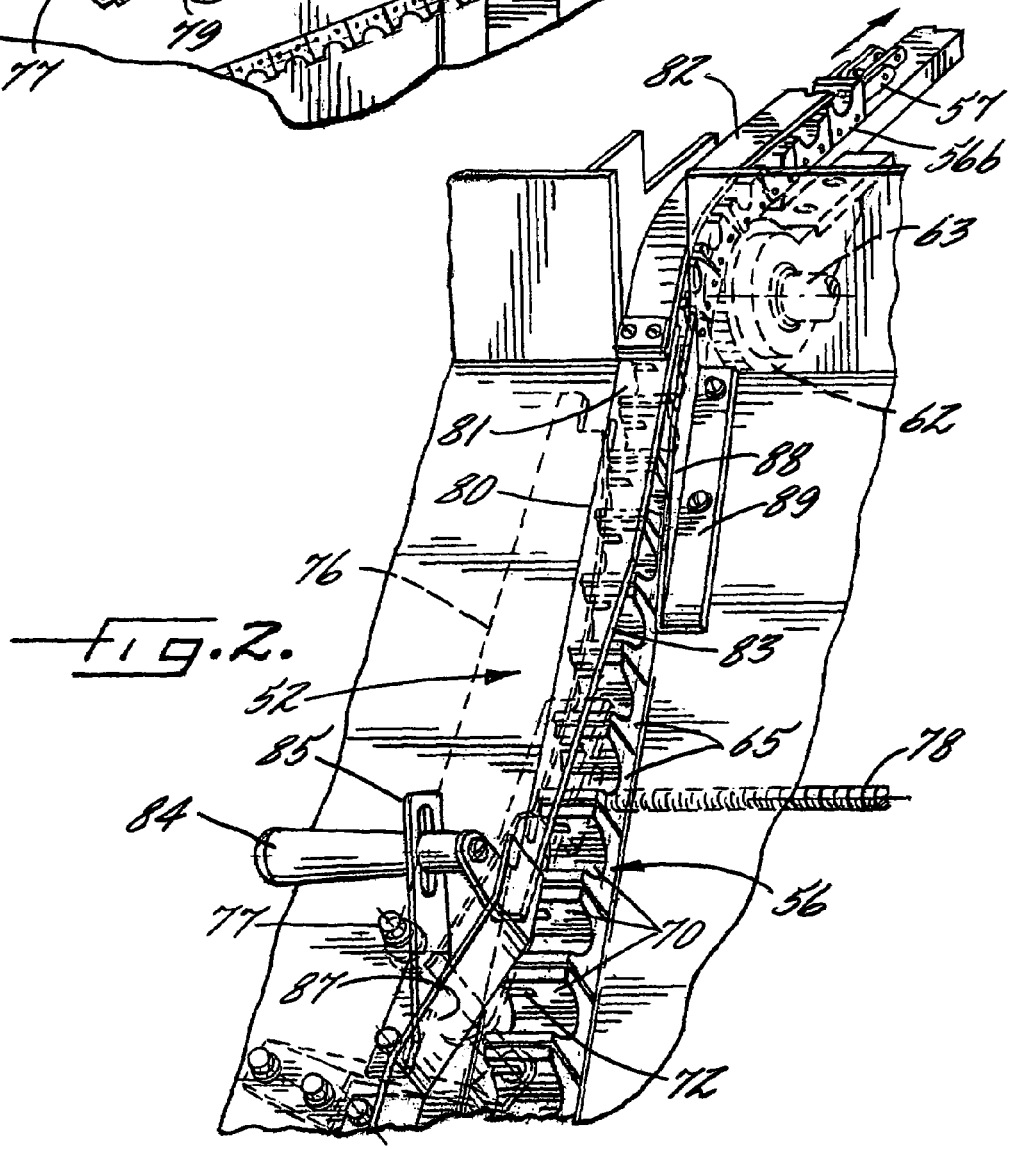
FIG. 2 is a fragmentary perspective view of the singularizing and orienting means of the present invention.

A plurality of block-like nut transport elements 65 are mounted in succession along the feed conveyor 56. As best seen in FIG. 2, and as further illustrated in U.S. Pat. No. 5,623,867, each element 65 includes parallel opposite sides, parallel opposite ends, and top and bottom faces (not numbered). A generally semi-cylindrical receptacle 70 extends laterally across the upper face of each element, and so as to communicate with both sides thereof. By design, each receptacle 70 is sized to supportingly receive a single nut to be cracked which is oriented with its end to end direction extending axially along the receptacle. Each element 65 further includes a longitudinally channel in the bottom face for receiving the feed chain 57, and a pair of transverse pins 71 (FIGS. 3A and 3B) for interconnecting the element to the chain. Further, each element 65 includes a slot 72 which extends longitudinally along the full length of the left side as seen in FIG. 2, and which is disposed parallel to the bottom face of the element. The slot 72 extends laterally a portion of the distance across the element, and communicates with the receptacle 70. The portion of the top face forwardly of receptacle may be inclined downwardly, so that the portion rearwardly of the receptacle in effect protrudes upwardly so as to catch the nuts in the hopper and knock them into the receptacle.

The conveyor 56 is powered by the motor (not shown) and drive chain 74, which drives the sprocket 59 and which also drives the turret 20 in the manner seen in FIG. 1, and such that the transport elements and thus the nuts move from the hopper tangentially past the circle defined by the rotating cracking units 24, at a speed corresponding to such rotational speed. Also, the common drive permits the movements of the feed conveyor 56 and the turret 20 to be coordinated so that at the delivery point each of the cracking units 24 is aligned with a respective one of the nut transport elements 65, with the anvil and cracking die thereof being disposed on opposite sides of the nut transport element and aligned with the receptacle 70.

A rectangular channel (not shown) is formed in the bottom wall of the hopper 55 and serves to partially receive and guide the nut transport elements 65 of the conveyor. Also, the bottom wall of the hopper may include slots (not shown) for permitting the removal of shell fragments and other debris. A further description of the channel and slots may be found in the above referenced patents.

The hopper 55 includes singularizing and orienting means to ensure that any nuts in excess of one are removed from the receptacle 70 of each nut transport element 65, and that each nut is oriented with its end to end direction extending axially along the receptacle 70.

The singularizing and orienting means of the apparatus includes means for laterally ejecting any laterally oriented nuts in excess of one for each receptacle. This ejecting means comprises an arm 76, which is mounted in the hopper so that the arm extends a predetermined lateral distance into the slot 72 of each advancing nut transport element, to thereby deflect each nut therein which is adjacent the left side and so that it moves toward the right side. The arm 76 is mounted for pivotal adjustment about the mounting pin 78, and the means for adjusting the lateral extent of the arm 76 into the slots 72 comprises a threaded control rod 78 which is connected between the arm 76 and an external actuating wheel 79. Thus the distance between the innermost portion of the arm and the right side of the transport elements 65 can be adjusted to correspond to the average length of the nuts being processed. Also, in the event two relatively small nuts are positioned in any receptacle in end to end alignment, the arm will serve to eject the one closest to the right side. This feature is more fully described in copending application Ser. No. 11/201,827, filed Aug. 11, 2005.

The singularizing and orienting means further comprises a deflecting plate 80 positioned so as to continuously overlie the path of the nut transport elements 65 from a point along the upwardly inclined segment, along the arcuate transition juncture, and to a point immediately adjacent the delivery point, i.e. the bottom dead center position of the turret 20.

It will also be noted from FIG. 2 that the deflecting plate 80 overlies the operative portion of the ejecting arm 76, and thus serves to prevent nuts from lifting upwardly from the associated receptacle upon being contacted by the arm.

The deflecting plate 80 comprises an upstream end portion which comprises a relatively rigid metal bar 81, and a downstream end portion which comprises a highly flexible and relatively soft elongate flap 82. The rigid bar 81 has a forward edge 83 which extends diagonally across the path of the elements 65, and the bar is pivotally connected adjacent its upstream end for pivotal movement about a horizontal axis defined by an anchoring pin 84, and such that the bar may be lifted upwardly from the elements 65 in the event a foreign object, such as a rock, enters the hopper and moves between the elements 65 and the bar. The pin 84 is in turn mounted to a bracket 85 so as to permit its elevation to be adjusted, and thus permit the elevation of the upstream end of the bar to be adjusted.

Figure 3A:
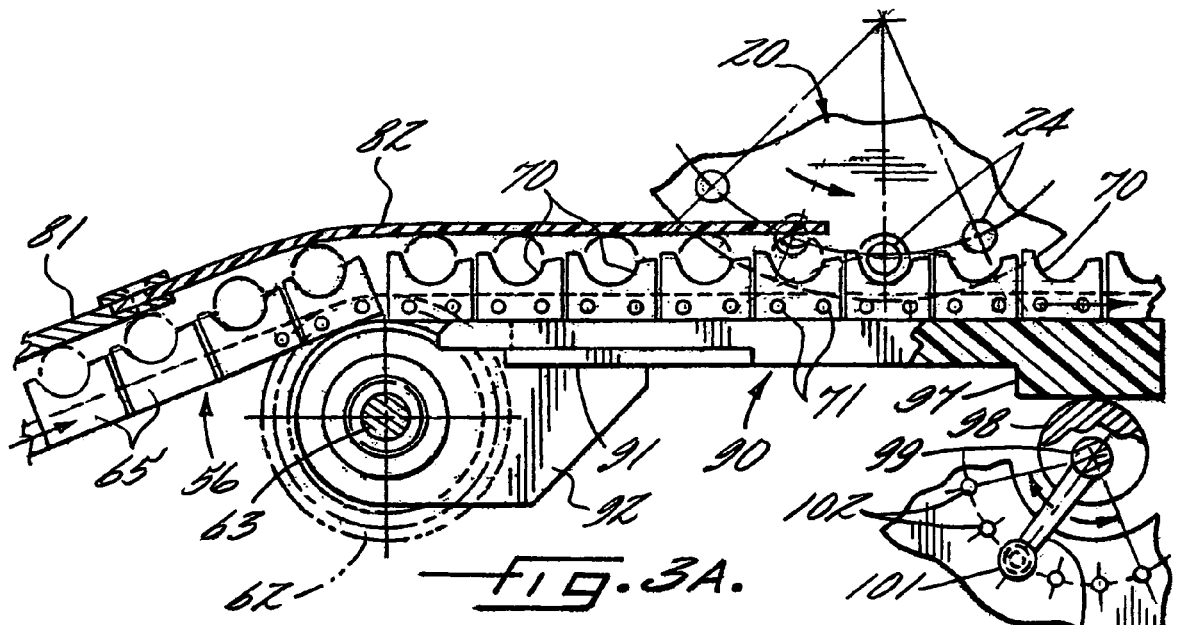
FIG. 3A is a fragmentary partly sectioned side elevation view of the horizontal section of the conveyor where it moves past the nut delivery or pick up point.
Figure 3B:
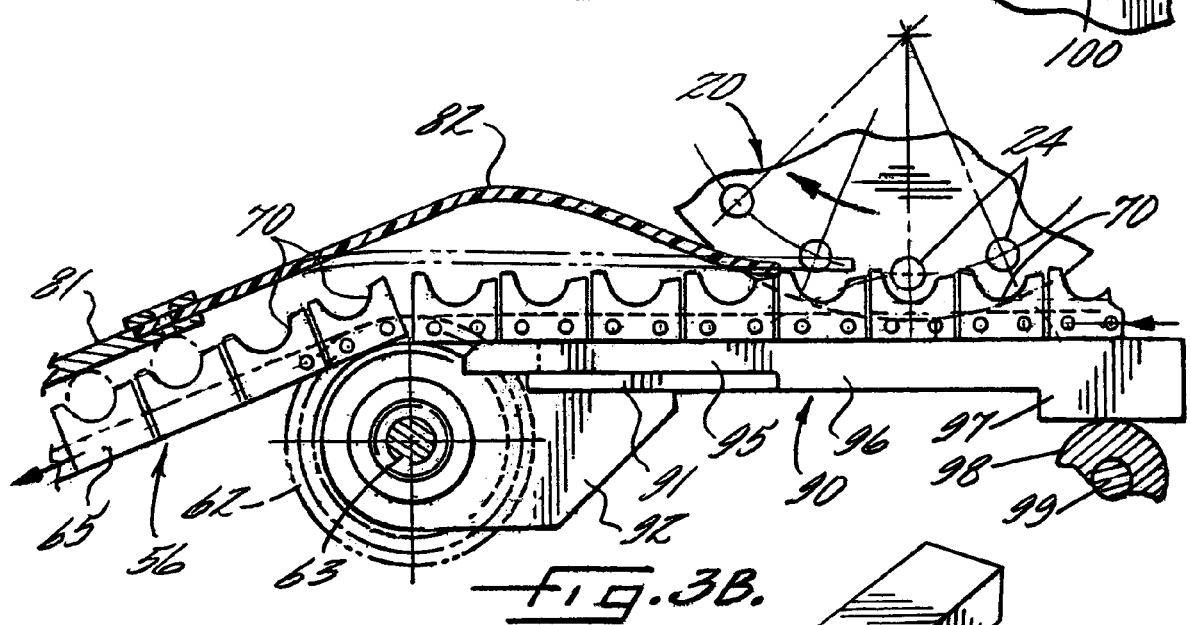
FIG. 3B is a view similar to FIG. 3A and showing the effect of rotating the turret in the reverse direction.

The rigid bar 81 extends along the upwardly inclined segment of the upper run of the conveyor to a point adjacent the arcuate transition, and the flap 82, which is composed of an elastomeric material, extends over the arcuate transition juncture and to a point just short of the delivery point at the bottom dead center position of the turret 20, note FIG. 3A. Also, the flap 82 is configured to rest upon the nuts being conveyed by the transport elements 65 along the horizontal segment of the upper run of the conveyor.

The elastomeric flap 82 can be fabricated from a variety of the polymeric materials, and as a preferred embodiment, it may be composed of urethane having a durometer hardness of 20/30 A. Also, in a preferred embodiment, the flap is 18 inches long, 2 inches wide, and ¼ inch thick. With such a composition and configuration, the flap possesses a high degree of flexibility and it has a "sticky" feel which engages the nuts with sufficient friction to cause the nuts to roll about their end to end axes in the receptacles 70 of the nut transport elements 65 as they advance toward the delivery point. As noted above, this rolling action significantly contributes to the nuts being consistently aligned in the receptacles.

The bottom wall of the hopper also mounts a guide plate 87 which is positioned upstream of the deflecting plate 80 and so as to extend laterally along the left edge portion of the feed conveyor 56 as seen in FIG. 2. The guide plate 87 serves to deflect any nuts that are standing up in the left side of the receptacles 70 of the nut transport elements 65, and thereby prevents such nuts from impacting and catching under the upstream end of the deflecting plate 80.

The hopper 55 also mounts an upwardly inclined guide surface 88 which is formed on the support member 89 along the right side of the elements 65, and downstream of the forward edge 83 of the deflecting plate 80 and the ejecting arm 76. The guide surface 88 is positioned so as to contact that portion of any nut extending laterally from its supporting receptacle 70 on the right side, and acts to move the nut back into the receptacle.

Figure 4:
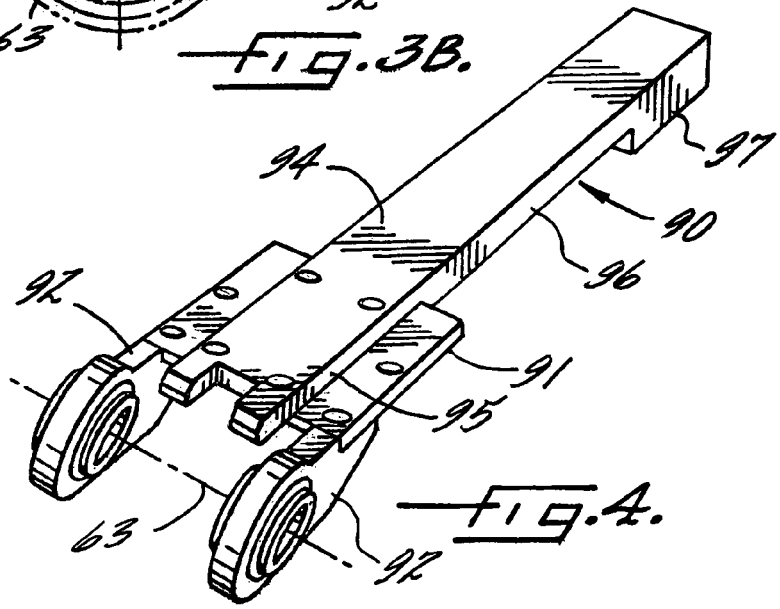
FIG. 4 is a perspective view of the support plate and its mounting framework.
Figure 5A:
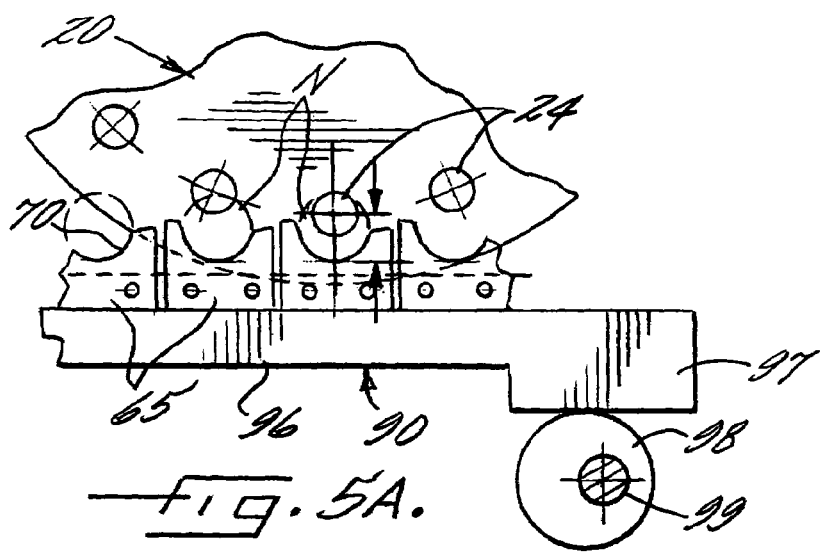
FIG. 5A is a fragmentary side elevation view illustrating the support plate and its elevating eccentric.
Figure 5B:
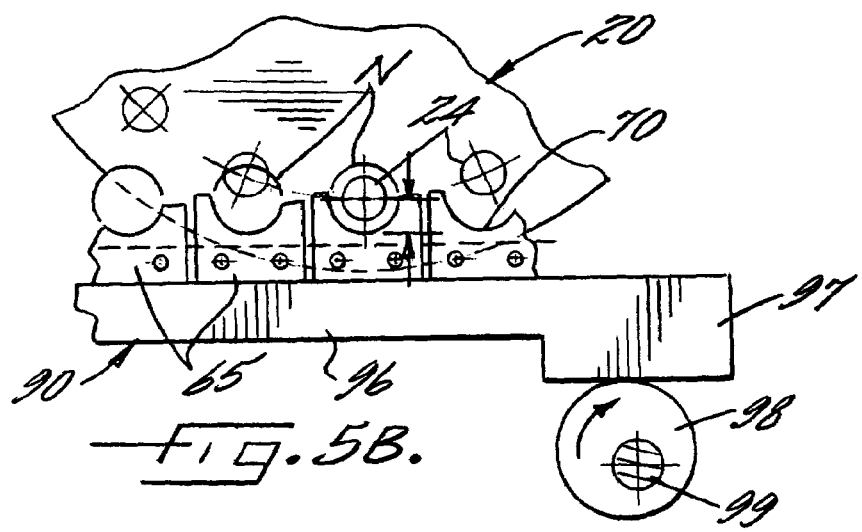
FIG. 5B is a view similar to FIG. 5A and illustrating the eccentric rotated to a position to lift the nut transport elements relative to the turret.

As the nut transport elements 65 advance along the horizontal segment toward and through the delivery point, they are supported by an elongate support bar 90 which is adjustable in elevation with respect to the cracking units in the turret. More particularly, and as best seen in FIGS. 4, 5A, and 5B, the support bar 90 is mounted on a generally horizontal platform 91, and the platform 91 is connected to two support arms 92 which mount aligned bearings, which are in turn mounted on the shaft 63 so as to permit rotation about the axis of the shaft.

The support bar 90 comprises a one piece elongate member which is composed of a polymeric material, and it is relatively rigid but sufficiently flexible to permit the portion thereof immediately below the delivery point to resiliently flex downwardly. In a preferred embodiment, the support bar has a flat upper surface 94, and a bottom surface which is defined by a first end portion 95 of minimal thickness, a mid portion 96 of intermediate thickness, and an opposite end portion 97 of maximum thickness. The first end portion 95 is secured upon the platform 91, and so that the mid portion 96 directly underlies the delivery point on the turret.

The opposite end portion 97 of the support bar 90 is supported by an eccentric 98, which is fixed to a rotatable shaft 99. The shaft can be rotated by an attached lever arm 100, so that pivotal movement of the lever arm 100 causes the eccentric 98 to rotate and the end portion 97 to be raised or lowered, note FIGS. 5A and 5B. Also, the end of the lever arm 100 includes a releasable pin 101 which is configured to selectively engage one of a series of arcuately arranged openings 102 in the frame of the apparatus to lock the eccentric in a desired position.

It will also be noted that the mid portion 96 of the support bar is located between the pivot axis defined by the shaft 63 at one end of bar and the eccentric 98 which is adjacent the other end of the bar. The mid portion also directly underlies the delivery point on the turret, and in the event of an impact resulting from an extended anvil 32 in a cracking unit 24 as described above, the mid portion 96 will bow downwardly and absorb the force. By design, the mid portion has sufficient strength to absorb the impact without breaking, and it has sufficient flexibility to permit it to deform and then return to its original configuration.

In one preferred embodiment, the support bar 90 is fabricated from urethane having a 90 A durometer hardness rating, and the mid portion 96 is about 1½ inches in thickness.

To describe the operation of the apparatus in more detail, it will be understood that the motor acts via the drive chain 74 to rotate the turret 20 about the central axis of the shaft 15, and to advance the conveyor 56 so that the upper run moves toward the turret at a speed corresponding to the rotational speed of the cracking units 24. The nut transport elements 65 thereby move in succession through the hopper 55, and the nuts therein are received in the receptacles 70, and singularized and oriented by contact with the deflecting plate 80, and arm 76, in the manner described above. The nuts are thereby effectively individually received in the respective receptacles 70, and oriented with their end to end direction being disposed horizontally and perpendicular to the direction of movement of the upper run of the conveyor.

By design, the nuts are moved in succession to the openings between the anvil 32 and cracking die assembly 34 of a cracking unit 24 as the cracking unit passes a nut delivery or pick up point, which is located at about the bottom dead center of the circle defined by the rotating cracking units. By adjustment of the elevation of the support bar 90 using the eccentric 98, the centerline of the nuts being processed can be accurately aligned with the axis along which the anvil and cracking die are moved. At this point, pressurized air is directed to the first port 40 of the cracking unit. The piston 38 and anvil 32 are thereby moved forwardly, and such that the anvil operatively engages one end of the nut N in the opening, and with the force acting through the nut to clampingly engage and retain the nut in an end to end alignment between the anvil 32 and the cracking die 35 of the die assembly 34. The nut is thereby lifted from its receptacle on the feed conveyor 56. The frictional contact between the piston 38 and the walls of the air cylinder 37 serve to maintain the forward axial position of the anvil during rotational movement of the cracking unit upwardly and away from the conveyor.

The nut is then advanced along a curvilinear path of travel, i.e., the circle defined by the rotating cracking units 24, and to a nut stressing location, which is located about 60 degrees beyond the bottom dead center. At this location, air again enters the first port 40 to compressively stress the retained nut. Immediately thereafter, high pressure air is injected into the port 48 of the air cylinder 44, such that the shuttle 46 is thrust forwardly along the cylinder 44 and impacts against the rear side of the cracking die 35, causing the cracking die to sharply advance a short distance forwardly and thereby crack the nut. The air in front of the advancing shuttle exhausts through the port 47, which is of relatively large diameter to accommodate the entering air without an undue build-up of pressure. Most of the loose shell fragments resulting from the cracking operation are drawn off through a housing by a vacuum as described in pending application Ser. No. 11/145,586 filed Jun. 6, 2005. Further, the cracking operation preferably occurs while the nut remains under compressive stress.

The cracked nut remains supported between the anvil and cracking die after the cracking operation, and is carried to a release point, which is preferably positioned at about 45 degrees beyond the top dead center position of the turret. At this point, air enters the second port 42, and the piston and anvil are moved rearwardly. The released nut then falls into the laterally directed discharged chute 49 (FIG. 1).

As the final step, air is caused to enter the port 47, and the shuttle 46 to return to its rearward position. The cycle may then be repeated as the cracking units move through the loading position to receive another nut from an aligned receptacle.

In the drawings and specification, there has been set forth a preferred embodiment of the invention, and although specific terms are employed, they are used in a generic and descriptive sense only and not for purposes of limitation.

The invention claimed is:

1. An apparatus for successively delivering nuts in a predetermined orientation to a cracking head of a nutcracker, and comprising a hopper for storing a relatively large quantity of the nuts to be cracked, an endless conveyor having an upper run extending through said hopper to a delivery point exteriorly thereof, with said conveyor comprising a feed chain and a plurality of nut transport elements mounted in succession on said feed chain, with each element including opposite sides and a generally semicircular, laterally extending receptacle which faces upwardly during movement of the element through said hopper and to said delivery point, and with each receptacle being sized to supportingly receive a single nut to be cracked which is oriented with its end to end direction extending along the receptacle, said upper run of said endless conveyor including an upwardly inclined segment extending through the lower portion of said hopper and a substantially horizontal segment extending from said upwardly inclined segment to said delivery point, and with the upwardly inclined segment and the horizontal segment defining an arcuate transition juncture therebetween, a drive for rotating said endless conveyor such that said nut transport elements move in succession through said hopper and to said delivery point, and a deflecting plate positioned so as to continuously overlie the path of the nut transport elements from a point along said upwardly inclined segment, along said transition juncture, and to a point immediately adjacent said delivery point, and with said deflecting plate being mounted such that the plate may be lifted upwardly from the elements, and said deflecting plate comprising a downstream end portion viewed in the direction of movement of the nut transport elements and which comprises a highly flexible and relatively soft elongate flap which is composed of an elastomeric material and which is configured to rest upon the nuts being conveyed by the transport elements along the horizontal segment of the upper run of the conveyor and toward the delivery point.

2. The apparatus as defined in claim 1 wherein said deflecting plate further comprises an upstream end portion which comprises a relatively rigid bar, and with the elastomeric flap being connected to the downstream end of the rigid bar.

3. The apparatus as defined in claim 2 wherein said rigid bar extends along said upwardly inclined segment of the upper run of the conveyor to a point adjacent said arcuate transition juncture, and said elastomeric flap extends from said point to the downstream end of said deflecting plate.

4. The apparatus as defined in claim 3 wherein said elastomeric flap overlies the arcuate transition juncture.

5. The apparatus as defined in claim 2 wherein said rigid bar of said deflecting plate is mounted by means of a horizontal pivotal connection adjacent the upstream end of the deflecting plate.

6. The apparatus as defined in claim 5 wherein said rigid bar of said deflecting plate includes a forward edge which extends diagonally across the path of travel of the transport elements for orienting each nut received in the receptacles with its end to end direction extending along the associated receptacle.

7. The apparatus as defined in claim 1 wherein said elastomeric flap comprises a polymeric material.

8. The apparatus as defined in claim 7 wherein said elastomeric flap comprises urethane which has a durometer hardness rating of about 20/30 A.

9. The apparatus as defined in claim 1 further comprising means for lifting the advancing nuts in succession from the nut transport elements at the delivery point and advancing the removed nuts in succession from the delivery point along a generally curvilinear path of travel, and including means for clampingly engaging each nut during its removal from the associated nut transport element and advance along the curvilinear path of travel so as to preserve the predetermined end to end orientation of each nut, and means for imparting a cracking force to each nut while being advanced along the curvilinear path of travel, and with the cracking force being applied in a direction corresponding to the end to end clamping engagement of the nut.

10. The apparatus as defined in claim 9 wherein the means for lifting and advancing the nuts comprises a turret mounted for rotation about a central axis which is perpendicular to and above the upper run of the endless conveyor at the delivery point, a drive for rotating the turret about the central axis, a plurality of cracking units mounted to said turret so as to extend parallel to each other and to said central axis, with each of said cracking units comprising an anvil and a cracking die mounted so as to be moveable toward and away from each other.

11. The apparatus as defined in claim 10 further comprising means for adjusting the elevation of the horizontal segment of the upper run of the conveyor at said delivery point, and comprising an elongate support bar positioned to underlie and support the nut transport elements as they advance across the delivery point, with said support bar being pivotally mounted so as to be selectively moveable toward and away from said delivery point, and wherein said support bar comprises a polymeric material and is sufficiently flexible to permit the portion thereof immediately below said delivery point to resiliently flex downwardly.

12. The apparatus of claim 11 wherein said elongate support bar comprises urethane which has a durometer hardness rating of about 90 A.

13. A high production nutcracking apparatus comprising, means for advancing a plurality of nuts individually in succession along a first path of travel with at least substantially all of the advancing nuts being disposed in a predetermined orientation, means for lifting the advancing nuts in succession from the first path of travel at a delivery point and advancing the removed nuts in succession from the delivery point along a generally curvilinear second path of travel, and including means for clampingly engaging each nut during its removal from the first path of travel and advance along the second path of travel so as to preserve the predetermined orientation of each nut, means for imparting a cracking force to each nut while being advanced along the second path of travel, and with the cracking force being applied in a direction corresponding to the clamping engagement of the nut, said means for advancing nuts along the first path of travel including means for adjusting the elevation of the first path of travel with respect to the lifting means at the delivery point, and so as to accommodate nuts of different sizes, wherein said means for adjusting the elevation comprises an elongate support bar positioned to underlie and support the nut transport elements as they advance across the delivery point, with said support bar being pivotally mounted so as to be selectively moveable toward and away from said delivery point, and wherein said elongate support bar comprises a polymeric material and is sufficiently flexible to permit the portion thereof immediately below said delivery point to resiliently flex downwardly.

14. The apparatus as defined in claim 13 wherein said means for adjusting the elevation of the first path of travel further comprises an eccentric positioned to engage an under surface of the support bar, and a control arm for selectively rotating and retaining the eccentric in an adjusted position.

15. The apparatus as defined in claim 14 wherein the support bar is pivotable about a pivot axis which is spaced from the delivery point and adjacent one end of the support bar, and wherein the eccentric is spaced from the delivery point and adjacent the other end of the support bar, and so that the delivery point is located between pivot axis and the eccentric.

16. The apparatus as defined in claim 13 wherein said elongate support bar comprises urethane.

17. The apparatus as defined in claim 16 wherein said elongate support bar has a durometer hardness rating of about 90 A and a thickness of about 1½ inches.

* * * * *